Feb. 24, 1942.  C. W. YELM  2,274,515
ENDLESS V-TYPE BELT
Filed July 13, 1940
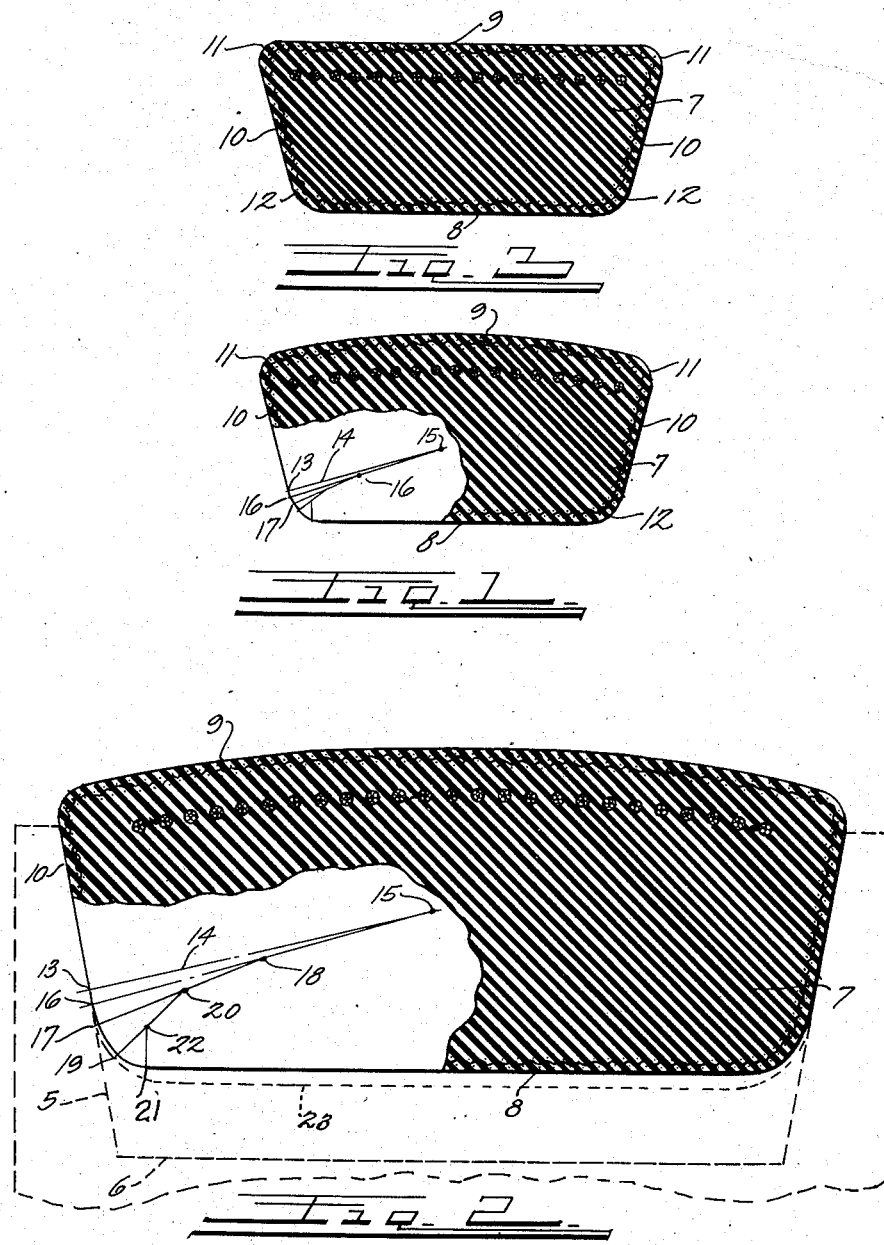
INVENTOR.
CHARLES W. YELM
BY Martin E. Anderson
ATTORNEY Patented Feb. 24, 1942

2,274,515

UNITED STATES PATENT OFFICE 2,274,515

ENDLESS V-TYPE BELT

Charles W. Yelm, Denver, Colo., assignor to The Gates Rubber Company, Denver, Colo., a corporation of Colorado Application July 13, 1940, Serial No. 345,290

3 Claims. (Cl. 74—234)

This invention relates to improvements in endless V-type belts. The use of V-type belts is very common in connection with power driven machinery of all kinds. Such belts are made in various widths and thicknesses and are usually constructed from a body of rubber composition whose outer surface is enclosed in one or more layers of bias cut rubberized fabric. The outer and inner surfaces of the belt may be straight and parallel, but it is more common to construct the belts with the outer surface transversely convex. Positioned in the body of the belt somewhat closer to the outer than to the inner surface, is a layer of substantially inextensible cords that form the neutral axis of the belt and serve to resist tensional strains.

When V-type belts are applied to pulleys where the curvature is greater than the curvature of the mould in which they were cured, the belt will be curved on a smaller radius than that of the curing mould, which produces compressive strains in that portion of the belt between the layer of cord and the inner surface thereof. Since the belt is constructed principally from rubber composition, the transverse cross sectional shape of the belt will change when such compressive strains occur and one of the changes resulting from this is to widen the distance between the inner ends of the inclined side walls. Belts of the type under consideration are used in connection with pulleys having V-shaped grooves of the proper angular inclination to obtain the best tractive effort with the belts employed. Due to the compression of the material in passing around the pulley, the belt engages the side walls of the pulley with greater force along its inner corners than along the outer corners thereof, with the result that when the belt begins to leave the pulley after having been in contact therewith through its entire arc of contact, this outward movement will be resisted by the pressure which is produced by the transverse expansion of the belt, due to its increased curvature. This "sticking" of the belt to the walls of the pulley produces an unnecessary wear and as a result thereof, the covering of the belt usually wears away at the inner edges of the inclined walls before it wears away at any other place. The "sticking" of the belt also produces a noise while running, which indicates unnecessary frictional resistance and loss of power.

It is the object of this invention to produce a V-type belt having such cross sectional shape that the "sticking" referred to above will be greatly decreased, thereby decreasing the amount of wear and to some extent at least, decreasing the noise produced while running.

It has been found that the deformation of the transverse section of the belt takes place mainly at the inner corners thereof and it has also been found that with the ordinary belts having sharp inner corners, the "sticking" effect is particularly noticeable and destructive to the belt.

Experiments have shown that if a belt of the type here under consideration, is so constructed that the inclined side walls are joined to the inner transverse wall of the belt by means of a curved surface whose rate of curvature increases progressively from the inner edge of the side wall to where it merges with the inner transverse wall, then the "sticking" action above pointed out will be greatly decreased and as a result thereof, the life of the belt correspondingly lengthened.

It has also been found that such belts will operate with the production of less noise than the ordinary belt in which the side walls connect with the inner wall along a sharp corner.

In order to more clearly describe this invention, reference will be had to the accompanying drawing in which the preferred cross sectional shape of the belt has been illustrated, and in which:

Figure 1 is a transverse section of a belt constructed in accordance with this invention, a portion of the cross section having been removed from one corner so as to permit the construction to be better illustrated;

Figure 2 is a fragmentary section similar to that shown in Figure 1, but drawn to substantially twice the scale; and Figure 3 is a cross section of a belt having straight inner and outer walls.

The line represented by reference numeral 5 in Figure 2 indicates the friction surface of a V-shaped pulley and reference numeral 6 designates the bottom of the V-shaped groove. The belt has been shown as of the usual construction and comprises a body 7 constructed principally of rubber compound which has been cured to produce an elastic resilient material. The inner surface of the belt has been designated by reference numeral 8 as straight, whereas the outer surface has been designated by reference numeral 9 and has been illustrated as outwardly convex. The inclined sides have been designated by reference numeral 10 and have been shown connected to the outer surface by means of a curved surface 11, whose curvature is preferably the same as that of the inner corners 12, which will now be described.

The side walls 10 may be perfectly straight or somewhat concave from their upper edges to the point indicated by reference numeral 13. A line 14 is drawn perpendicular to the side wall at point 13 and reference numeral 15 designates a center which is the center of curvature of that section of the curve between points 13 and 16. The center of curvature of that part of curve 12 between points 16 and 17 is located on line 16—15 and has been designated by reference numeral 18. That part of the curve between points 17 and 19 has its center of curvature on line 17—18 at the point designated by reference numeral 20 while that part of the curve between points 19 and 21 is located on line 19—20 at the point designated by reference numeral 22.

It will be seen from the above that the corners 12 are formed by curved surfaces whose rate of curvature increase progressively from point 13 to point 21 or, in other words, these surfaces are formed from a plurality of adjacent annular zones whose radii of curvature decrease progressively from point 13 to point 21.

In Figure 2 the full lines designate the normal shape of the belt before it begins to curve about the pulley and the dotted line 23 indicates the outline of the corners 12, and the inner surface 8 after the belt has been curved to conform to the pulley.

It will be observed from Figure 2 that the shape of the belt changes as a result of the compressive strains and that the transverse expansion is comparatively small between points 13 and 16, and since the curvature of that portion is comparatively small, that part of the corner surface will be moved into contact with the side 5 of the pulley, whereas the outer surface between points 16 and 17 may not come in contact with the friction surface of the pulley.

After the belt has passed around the pulley to the point where the arc of contact terminates, it will straighten quite suddenly, but instead of "sticking" to the sides of the pulley in the manner of the ordinary belt of this type, the part of the curved corner 12 between points 13 and 16 will move inwardly, thereby removing the pressure and permitting the belt to release freely from the pulley. The shape of the belt which permits the operation above described also results in the elimination of that part of the noise which is due to the forceful separation of the belt from the pulley, that is always present in belts of the usual shape.

Another result of this particular shape is that the belt can flex more readily due to the production of less compressive strains as a result of the added freedom and this greatly reduces band fatigue which in turn serves to increase the life of the belt.

Although the invention has been described in connection with Figures 1 and 2 which show a belt having a transversely convex outside surface, this is not essential. In Figure 3 a cross section of a belt has been shown in which the outside wall 9 is transversely straight and in which the layer of cords is also straight.

In the above description and in the drawing, the curvature has been shown as consisting of several arcuate segments of different curvature and this is believed to be the most practical curve to be employed, as it can be readily laid out on paper or on templets so as to facilitate the production of the moulds. It is possible to employ other forms of curves such as spirals or curves whose rate of curvature increases progressively in one direction which can be substituted if desired, and it is not the intention to limit the claims or this description to any specific curve.

In the embodiment illustrated, point 13 where the curve commences, has been shown as positioned nearer the base than the top of the belt. It is to be understood that the point at which the curve commences can be raised or lowered as may be found most suitable without departing from the invention and the specific shape of the belt can be varied within the scope of the appended claims.

Having described the invention what is claimed as new is:

1. An endless rubber composition belt of the V-type, of greater width than thickness, having a transversely straight inside wall and an endless core of substantially inextensible cords embedded therein, the material between the cord core and the inside wall being resilient and elastic whereby its shape will change in response to variations in belt flexure, in which the inclined side wall surfaces are joined to the inside wall of the belt by curved surfaces whose curvature increases progressively from the inclined side walls to the inside wall.

2. An endless rubber composition belt, of the V-type, of greater width than thickness, having a transversely straight inside wall and an endless core of substantially inextensible cords embedded therein the material between the cord core and the inside and the outside walls being resilient and elastic whereby that portion positioned between the cord core and the inside wall will be compressed and change its shape in response to belt flexure, in which the inclined side wall surfaces are joined to the inside and the outside wall surfaces by curved surfaces whose curvature increases progressively from the inclined side walls.

3. A rubber composition belt of the V-type having an endless core of substantially inextensible cords embedded therein, the material between the cord core and the inside wall being resilient and elastic whereby its shape will change in response to distorting forces developed when the belt is flexed, in which the inclined wall surfaces of the belt are joined to the inside wall thereof by curved surfaces, whose curvature increases progressively from the inclined side walls to the inside wall.

CHARLES W. YELM.